(12) United States Patent
Hua et al.

(10) Patent No.: US 10,687,459 B2
(45) Date of Patent: Jun. 23, 2020

(54) SEEDLING TRANSPLANTING DEVICE (71) Applicant: Cixi Huazhijie Plastic Product Co., Ltd., Cixi (CN)

(72) Inventors: Jie Hua, Cixi (CN); Shimin Hua, Cixi (CN)

(73) Assignee: Cixi Huazhijie Plastic Product Co., Ltd., Cixi (CN)

(*) Notice: Subject to any disclaimer, the term of this patent is extended or adjusted under 35 U.S.C. 154(b) by 325 days.

(21) Appl. No.: 15/747,683

(22) PCT Filed: Mar. 13, 2017

(86) PCT No.: PCT/CN2017/000225
§ 371 (c)(1),
(2) Date: Jan. 25, 2018

(87) PCT Pub. No.: WO2018/152657
PCT Pub. Date: Aug. 30, 2018

(65) Prior Publication Data
US 2020/0077575 A1    Mar. 12, 2020

(30) Foreign Application Priority Data
Feb. 23, 2017   (CN) .......................... 2017 1 0100483

(51) Int. Cl.
*A01C 11/02*      (2006.01)
*A01C 5/02*       (2006.01)
(52) U.S. Cl.
CPC ................ *A01C 11/02* (2013.01); *A01C 5/02* (2013.01)

(58) Field of Classification Search
CPC .. A01C 11/02; A01C 5/02; A01B 1/16; A01B 1/165
See application file for complete search history.

(56) References Cited

U.S. PATENT DOCUMENTS

| 15,114 | A | * | 6/1856 | Atkins | ...................... | A01C 7/02 |
|---|---|---|---|---|---|---|
| | | | | | | 111/98 |
| 48,298 | A | * | 6/1865 | Moffett | ..................... | A01B 1/16 |
| | | | | | | 254/132 |
| 328,983 | A | * | 10/1885 | Hayes | ...................... | A01B 1/16 |
| | | | | | | 254/132 |
| 1,065,606 | A | * | 6/1913 | Hayes | ...................... | A01B 1/16 |
| | | | | | | 254/132 |
| 1,133,776 | A | * | 3/1915 | Wirt | ......................... | A01B 1/16 |
| | | | | | | 7/114 |

(Continued)

*Primary Examiner* — Jamie L McGowan
(74) *Attorney, Agent, or Firm* — Wang Law Firm, Inc.

(57) ABSTRACT

A seedling transplanting device, includes: a handheld rod (1); a seedling digging assembly; wherein the seedling digging assembly includes: a fixed insertion member (2); a movable insertion member (3) with a top and a bottom, the movable insertion member is separated by a space from the fixed insertion member (2); and a driving assembly connected to the movable insertion member, the driving assembly causes the movable insertion member (3) to swing toward the fixed insertion member (2). The driving assembly causes the movable insertion member to swing toward the fixed insertion member, and after the seedling is taken out, the soil with the seedling will not drop out from the bottom of the fixed insertion member and the movable insertion member.

9 Claims, 6 Drawing Sheets

(56) References Cited

U.S. PATENT DOCUMENTS

| | | | | |
|---|---|---|---|---|
| 1,498,368 A * | 6/1924 | Fields | A01C 5/02 | 222/350 |
| 1,563,625 A * | 12/1925 | Lando | A01C 5/02 | 111/108 |
| 1,654,780 A * | 1/1928 | Bersted | A01B 1/16 | 254/132 |
| 1,814,216 A * | 7/1931 | Hartwell | A01B 1/16 | 294/50.9 |
| 1,870,043 A * | 8/1932 | Erickson | A01C 5/02 | 111/106 |
| 1,919,396 A * | 7/1933 | Sadler | A01B 1/18 | 254/132 |
| 2,216,720 A * | 10/1940 | Cousins | A01C 5/02 | 111/108 |
| 2,790,670 A * | 4/1957 | Sheets | A01B 1/16 | 294/50.9 |
| 2,901,280 A * | 8/1959 | Hall | A01B 1/16 | 294/50.8 |
| 3,027,856 A * | 4/1962 | Dannevig | A01C 7/02 | 111/95 |
| 3,152,788 A * | 10/1964 | Hardwidge | A01B 1/18 | 254/132 |
| 3,218,099 A * | 11/1965 | Stamborski | A01B 1/16 | 294/104 |
| 3,567,264 A * | 3/1971 | Baber | A01B 1/16 | 294/50.7 |
| 3,604,377 A * | 9/1971 | Smith | A01G 23/02 | 111/106 |
| 3,608,644 A * | 9/1971 | Ambrose | A01B 1/16 | 172/378 |
| 3,663,050 A * | 5/1972 | Fuchs | A01B 1/16 | 294/50 |
| 3,749,034 A * | 7/1973 | Bergius | A01C 5/02 | 111/106 |
| 3,765,347 A * | 10/1973 | Tormstrom | A01C 5/04 | 111/200 |
| 3,797,417 A * | 3/1974 | Hahn | A01C 5/02 | 111/115 |
| 4,444,131 A * | 4/1984 | Marttinen | A01C 5/02 | 111/107 |
| 4,706,582 A * | 11/1987 | Keskilohko | A01C 5/02 | 111/106 |
| 4,807,543 A * | 2/1989 | Paul | A01C 5/04 | 111/100 |
| 4,932,339 A * | 6/1990 | List | A01C 5/02 | 111/106 |
| 5,052,314 A * | 10/1991 | Leini | A01C 5/02 | 111/106 |
| 5,373,903 A * | 12/1994 | Lewis | A01B 1/14 | 172/375 |
| 5,431,467 A * | 7/1995 | Mlecka | A01B 1/18 | 111/106 |
| 5,438,940 A * | 8/1995 | Bristow | A01C 5/02 | 111/115 |
| 5,685,587 A * | 11/1997 | Putnam, Jr. | A01B 1/165 | 294/50.5 |
| 5,924,369 A * | 7/1999 | Hatcher | A01C 5/02 | 111/106 |
| 6,951,255 B2 * | 10/2005 | Shepherd | A01B 1/18 | 172/378 |
| 7,063,168 B2 * | 6/2006 | Paloheimo | A01B 1/18 | 172/378 |
| 8,925,985 B2 * | 1/2015 | Wyles | A01B 1/18 | 294/118 |
| 2004/0118328 A1 * | 6/2004 | Sawatzky | A01C 5/02 | 111/106 |
| 2016/0345487 A1 * | 12/2016 | Liao | A01C 5/02 | |

* cited by examiner

SEEDLING TRANSPLANTING DEVICE

RELATE APPLICATIONS

This application is a national phase entrance of and claims benefit to PCT Application for a seedling transplanting device, PCT/CN2017/000225, filed on Mar. 13, 2017, which claims benefit to Chinese Patent Applications 201710100483.6, filed on Feb. 23, 2017. The specifications of both applications are incorporated here by this reference.

FIELD OF THE INVENTION

The present invention relates to a seedling transplanting device.

DESCRIPTION OF THE PRIOR ART

In the seedling stage of crops, ornamental plants, fruit trees and other plants, due to planting needs, seedlings usually need to be transplanted or filled in gaps. Chinese Patent No. 201420478978.4 has disclosed a seedling transplanting device for fruit trees, comprising a seedling digging tube, connecting rods mounted on two sides of the seedling digging tube, and a soil compaction device in sliding fit with the connecting rods, wherein the whole seedling digging tube is of a hollow tubular structure with a pedal ring fixed in the vicinity of an upper end of the seedling digging tube; the soil compaction device comprises a soil compaction pedal which is in clearance and sliding fit with the connecting rods; a soil compaction ring connecting rod is welded on the bottom of the soil compaction pedal; the soil compaction ring connecting rod is located between the two connecting rods, and has a lower end in welded connection to a soil compaction ring; the soil compaction ring is in clearance and sliding fit with the seedling digging tube; and, a handle is welded at upper ends of the connecting rods. During operation, the seedling digging tube is first vertically inserted around a seedling, and the pedal ring is stamped on to allow the whole seedling digging tube to be vertically inserted into the surrounding soil of the seedling. During the insertion, the soil compaction pedal in socket fit with the connecting rods gradually moves up due to the drive of the soil compaction ring, until the whole seedling digging tube is completely inserted into the soil. Then, the handle is shaken to break up the soil around the bottom of the seedling digging tube, and the whole seedling digging tube is raised vertically. Finally, the soil compaction pedal is stamped on, and the seedling and the connected soil are taken out from the seedling digging tube under the drive of the soil compaction ring connecting rod and the soil compaction ring. In this way, seedlings are transplanted without damaging the surrounding soil of the root of the seedling, and the survival rate of seedlings is improved. However, this structure has the following disadvantages: since the whole seedling digging tube is of a hollow tubular structure having the same diameter in its upper and lower portions, after the seedling digging tube is inserted into the soil, it is required to shake the handle to break up the soil around the bottom of the seedling digging tube, and the whole seedling digging tube is raised vertically. Nonetheless, when the soil density is low or when the whole piece of soil is heavy, in the process of taking out the whole soil with the seedling, the soil with the seedling is likely to drop out from the seedling digging tube. It is difficult to take out the seedling.

SUMMARY OF THE INVENTION

It is an object of the present invention to provide a seedling transplanting device by which a seedling and the soil will not drop out when they are taken out.

For achieving this object, the seedling transplanting device comprises a handheld rod having a bottom; a seedling digging assembly connected to the bottom of the handheld rod; wherein the seedling digging assembly comprises:

a fixed insertion member with a top and a bottom, the top of the fixed insertion member is connected to the bottom of the handheld rod;

a movable insertion member with a top and a bottom, the movable insertion member is separated by a space from the fixed insertion member, the top of the movable insertion member is rotatably attached to the bottom of the handheld rod; and a driving assembly connected to the movable insertion member, the driving assembly causes the movable insertion member to swing toward the fixed insertion member.

As an improvement, the driving assembly comprises:

a driving body with a through hole, the bottom of the handheld rod being f inserted into the through hole of the driving body, a first driving shaft hole, a second driving shaft hole and a third driving shaft hole being formed on the driving body;

a pedal assembly with a first end, a first pedal shaft hole and a second pedal shaft hole being formed at the first end of the pedal assembly;

a first movable insertion member shaft hole and a second movable insertion member shaft hole both formed in the top of the movable insertion member, a center of the first movable insertion member shaft hole and a center of the second movable insertion member shaft hole are not aligned vertically;

the movable insertion member and the driving body are inserted into the first end of the pedal assembly, and a first rotating shaft, which passes through the first pedal shaft hole and the first driving shaft hole;

a second rotating shaft is inserted through the second pedal shaft hole, the second driving shaft hole, and the first movable insertion member shaft hole formed on the movable insertion member; and a third rotating shaft is inserted through the third driving shaft hole and the second movable insertion member shaft hole.

As an improvement, the second movable insertion member shaft hole has an elongated shape, and the second driving shaft hole has also an elongated shape; and, the second movable insertion member shaft hole is slanted in a direction opposite from a direction to which the second driving shaft hole slants.

Preferably, both the second driving shaft hole and the second movable insertion member shaft hole have an arc shape.

Preferably, the first end of the pedal assembly is sheathed outside the driving body.

Preferably, the pedal assembly comprises a fixed pedal member and a moving pedal member in rotatably folded connection to the fixed pedal member; and, the first end of the fixed pedal member is the first end of the pedal assembly, while the second end thereof is connected to the moving pedal member.

Preferably, the seedling transplanting device of the present invention further comprises a soil removal device, comprising a soil removal rod, a middle portion of the soil removal rod is movably sheathed on the handheld rod; a soil removal plate is connected to a bottom of the soil removal rod; a fixed insertion member hole and a movable insertion member hole are formed on the soil removal plate; the fixed insertion member is movably disposed within the fixed insertion member hole; and the movable insertion member is movably disposed within the movable insertion member hole.

Preferably, a raised auxiliary soil removal pedal pressing portion is disposed in the middle portion of the soil removal rod.

Preferably, the soil removal device further comprises a handheld soil removal jacket which is movably sheathed outside the handheld rod and fixedly connected to the top of the soil removal rod.

Preferably, the fixed insertion member refers to two metal pins arranged at interval, and the movable insertion member refers to two metal blades arranged at interval.

Lower portions of the metal blades have tips, and outer edges of the metal blades are cambered surfaces on which waves are formed.

Compared with the prior art, the present invention has the following advantages: the seedling transplanting device has a fixed insertion member and a movable insertion member, the driving assembly can drive the movable insertion member to swing toward the fixed insertion member; after the fixed insertion member and the movable insertion member are inserted into the soil, the driving assembly can decrease the distance between the bottom of the movable insertion member and the bottom the fixed insertion member, so that the soil with the seedling is positioned between the movable insertion member and the fixed insertion member, and after the seedling is taken out, the soil with the seedling will not drop out from the bottom of the fixed insertion member and the movable insertion member; moreover, the design of the seedling transplanting device of the present invention is simple and convenient in operation, high in efficiency, and effective.

DETAILED DESCRIPTION OF THE PREFERRED EMBODIMENT

To enable a further understanding of the present invention content of the invention herein, refer to the detailed description of the invention and the accompanying drawings below:

As shown in FIGS. 1-6, the seedling transplanting device comprises a handheld rod 1 having a bottom; a seedling digging assembly connected to the bottom of the handheld rod. The seedling digging assembly comprises:

a fixed insertion member 2 with a top and a bottom, the top of the fixed insertion member is connected to the bottom of the handheld rod 1;

a movable insertion member 3 with a top and a bottom, the movable insertion member is separated by a space from the fixed insertion member 2, the top of the movable insertion member 3 is rotatably attached to the bottom of the handheld rod 1; and a driving assembly connected to the movable insertion member, the driving assembly causes the movable insertion member 3 to swing toward the fixed insertion member 2.

In this embodiment, the fixed insertion member 2 refers to two metal pins arranged at interval, and the movable insertion member 3 refers to two metal blades arranged at interval. Bottoms of the metal blades have tips, and outer edges of the metal blades are cambered surfaces on which waves are formed. In this way, it is easy for insertion into the soil.

Figure 3:
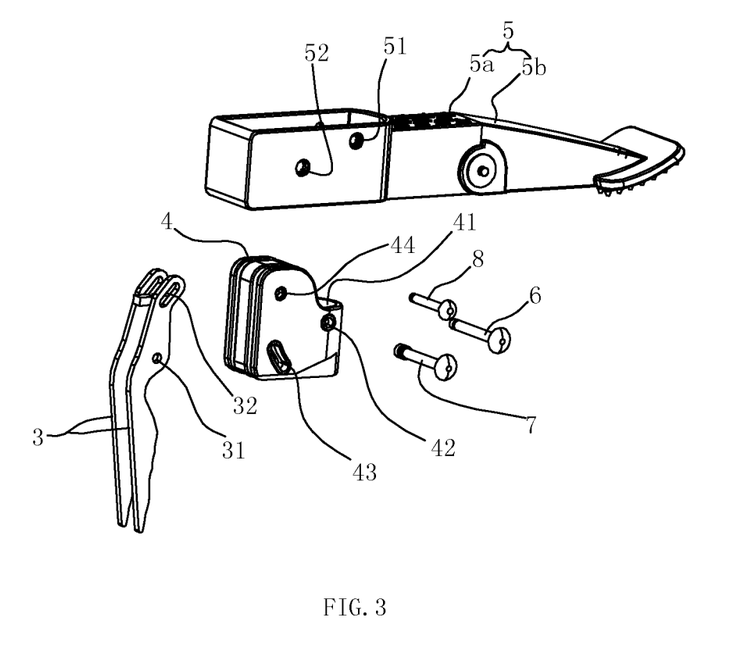
FIG. 3 is an exploded view of a driving assembly according to the embodiment of the present invention.

The driving assembly comprises:

a driving body 4 with a through hole 41, the bottom of the handheld rod 1 being inserted into the through hole 41 of the driving body 4, a first driving shaft hole 42, a second driving shaft hole 43 and a third driving shaft hole 44 being formed on the driving body 4, wherein the both the first driving shaft hole 42 and the third driving shaft hole 44 are circular holes, and the second driving shaft hole 43 has an elongated shape;

a pedal assembly 5 with a first end, a first pedal shaft hole 51 and a second pedal shaft hole 52 being formed at the first end of the pedal assembly 5, both the first pedal shaft hole 51 and the second pedal shaft hole 52 being circular holes;

a first movable insertion member shaft hole 31 and a second movable insertion member shaft hole 32 both formed in the top of the movable insertion member 3, a center of the first movable insertion member shaft hole 31 and a center of the second movable insertion member shaft hole 32 are not aligned vertically, wherein the first movable insertion member shaft hole 31 is a circular hole, the second movable insertion member shaft hole 32 has an elongated shape, and the second movable insertion member shaft hole 32 is slanted in a direction opposite from a direction to which the second driving shaft hole 43 slants;

the movable insertion member and the driving body are inserted into the first end of the pedal assembly, and a first rotating shaft 6, which passes through the first pedal shaft hole 51 and the first driving shaft hole 42;

a second rotating shaft 7 is inserted through the second pedal shaft hole 52, the second driving shaft hole 43, and the first movable insertion member shaft hole 31 formed on the movable insertion member 3; and a third rotating shaft 8, is inserted through the third driving shaft hole (44) and the second movable insertion member shaft hole 32.

The pedal assembly 5 comprises a fixed pedal member 5a and a moving pedal member 5b in rotatably folded connection to the fixed pedal member 5a; the first end of the fixed pedal member is the first end of the pedal assembly, while the second end thereof is connected to the moving pedal member. The first end of the pedal assembly 5 is sheathed outside the driving body 4.

Figure 1:
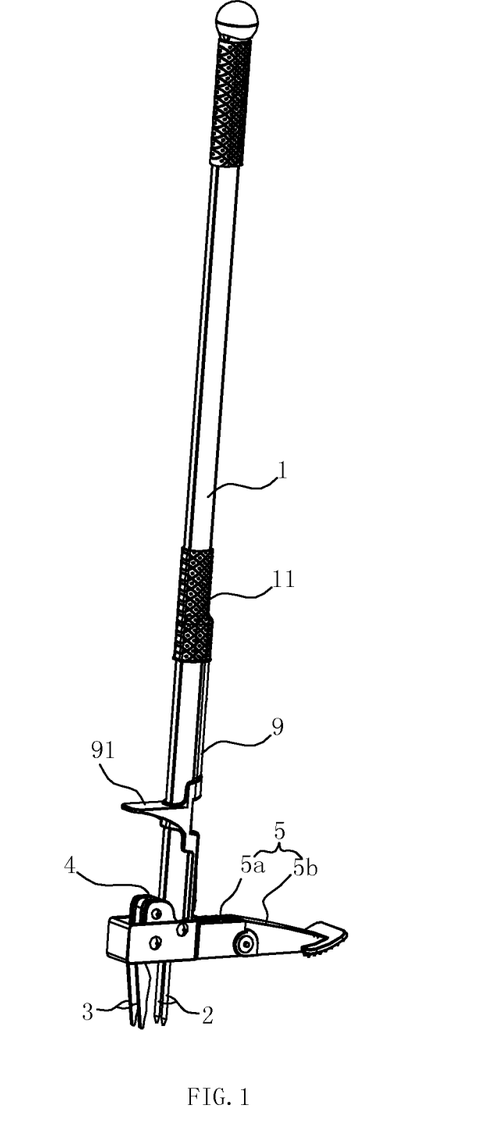
FIG. 1 is a perspective view of a seedling transplanting device according to an embodiment of the present invention (in the normal state)
Figure 2:
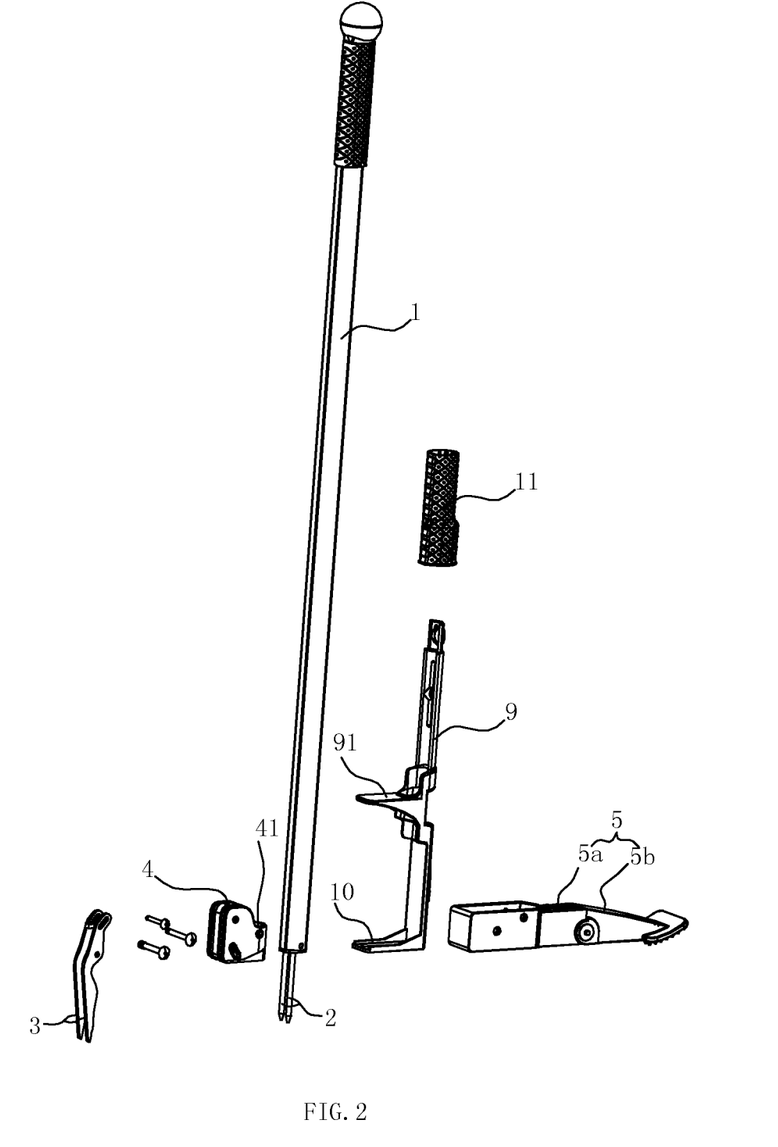
FIG. 2 is an exploded view of the seedling transplanting device according to the embodiment of the present invention.

Additionally, the seedling transplanting device in this embodiment further comprises a soil removal device, comprising a soil removal rod 9, a middle portion of the soil removal rod 9 is movably sheathed on the handheld rod 1; a soil removal plate 10 is connected to a bottom of the soil removal rod 9; a fixed insertion member hole and a movable insertion member hole are formed on the soil removal plate 10; the fixed insertion member 2 is movably disposed within the fixed insertion member hole, and the movable insertion member 3 is movably disposed within the movable insertion member hole; a raised auxiliary soil removal pedal pressing portion 91 is disposed in the middle portion of the soil removal rod 9; and, a handheld soil removal jacket 11 fixedly connected to the top of the soil removal rod 9 is movably sheathed outside the handheld rod 1.

Figure 4:
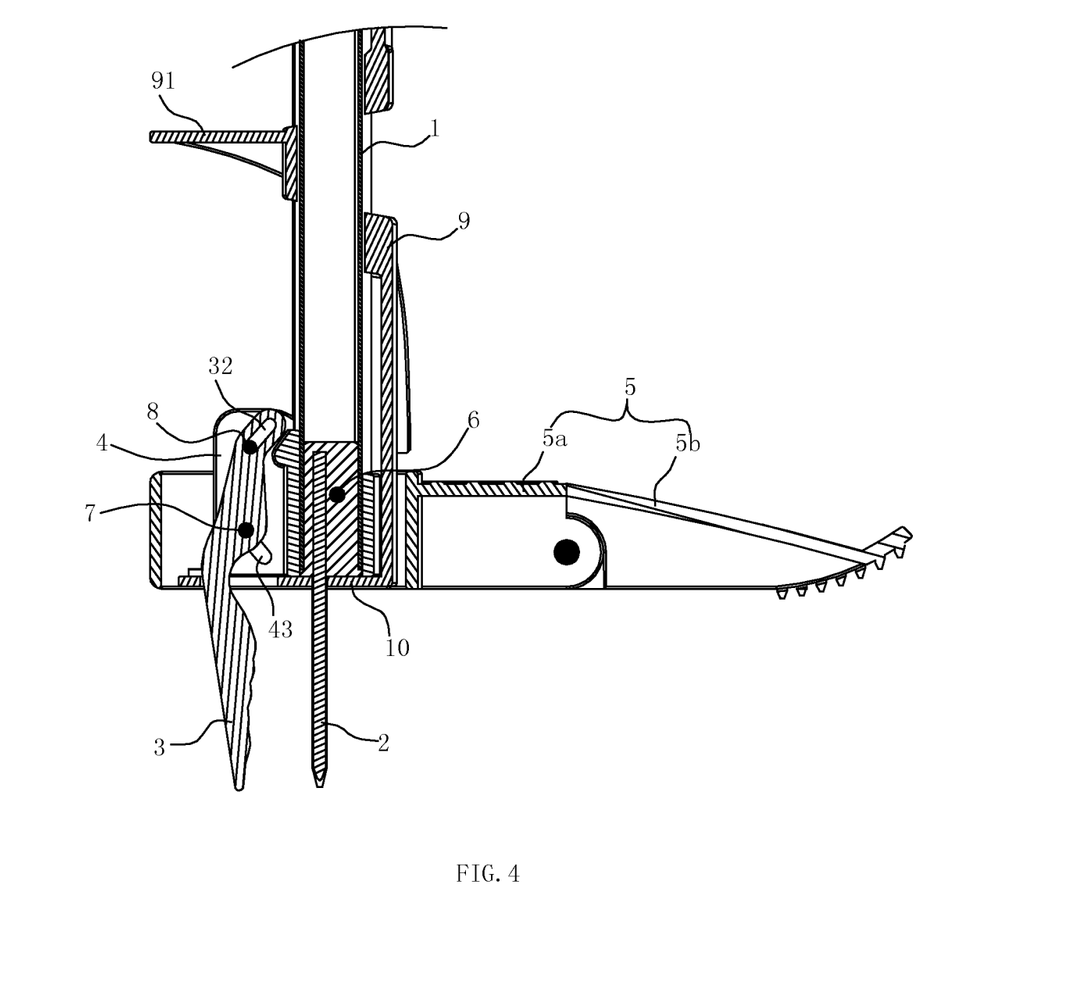
FIG. 4 is a sectional view of a seedling digging assembly (in the normal state)
Figure 5:
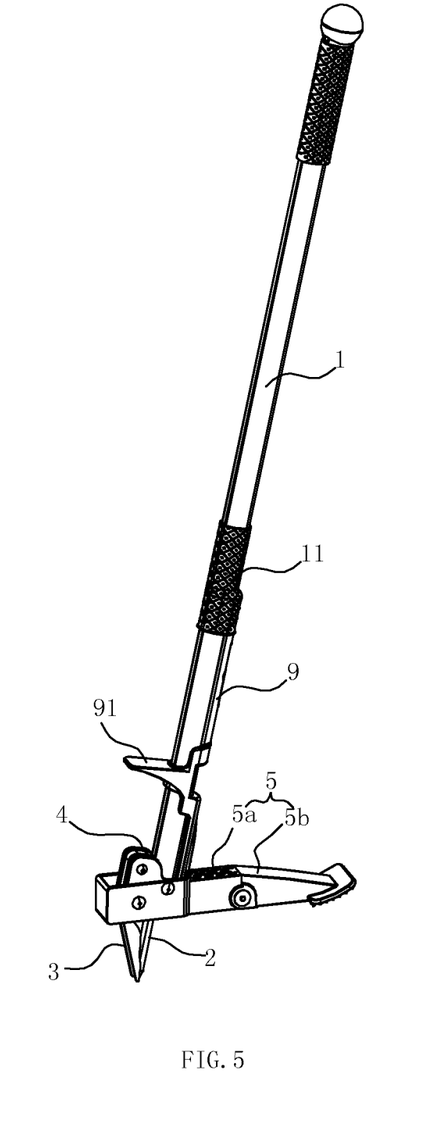
FIG. 5 is a perspective view of the seedling transplanting device according to the embodiment of the present invention (in the seedling digging state)
Figure 6:
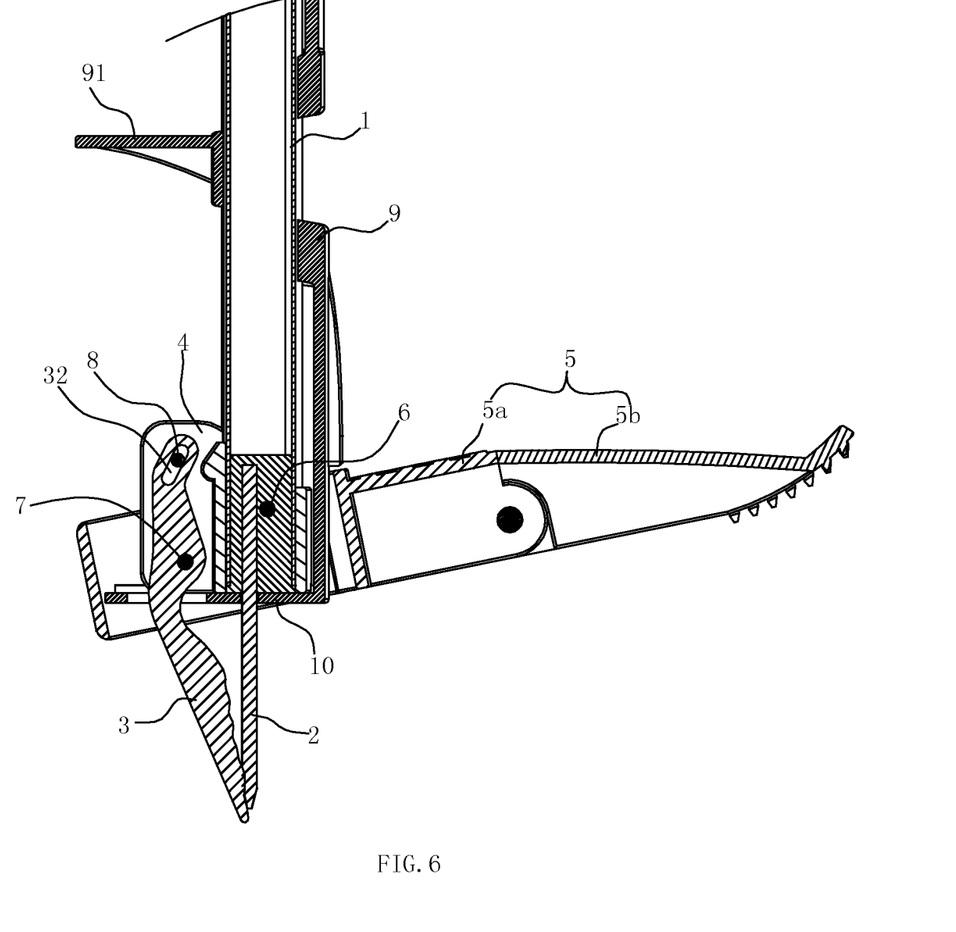
FIG. 6 is a sectional view of the seedling digging assembly (in the seedling digging state)

When in use, the handheld rod 1 is held by a hand, the fixed insertion member 2 and the movable insertion member 3 are vertically (a force can be applied to the pedal 5a) inserted into the surrounding soil close to the center of the root of a seedling, and the handheld rod 1 is swung obliquely towards one side (preferably a side close to the user's body) to allow the second end (free end) of the pedal assembly 5 to come into contact with the ground. The oblique swing force is continuously applied to the handheld rod 1 in the same direction to allow the second end of the pedal assembly 5 to obtain an upward pressure. In this case, the pedal assembly 5 is rotated about the first rotating shaft 6. Since the driving body 4 is fixed at the bottom of the handheld rod 1, the driving body 4 will neither be moved nor be rotated. Under the drive of the pedal assembly 5, the second rotating shaft 7 moves within the second driving shaft hole 43 of the driving body 4, and the movable insertion member 3 is rotated about the second rotating shaft 7. After the second rotating shaft 7 is moved to the bottom, the third rotating shaft 8 is synchronously moved to the bottom along the second movable insertion member shaft hole 32 at the top of the movable insertion member 3, and the second rotating shaft 7 is rotated so that the bottom of the movable insertion member 3 is moved in a direction close to the bottom of the fixed insertion member 2, as shown in FIGS. 4 and 5. In this way, the distance between the bottom of the movable insertion member 3 and the bottom of the fixed insertion member 2 is decreased, the "digging" of the seedling is realized, and the soil around the bottom of the seedling digging assembly is easily broken up. Subsequently, the seeding transplanting device is taken out, and the seedling is pushed to a desired position by a handle 11 (or by an auxiliary soil removal pedal 91). Then, the distance between the bottom of the movable insertion member 3 and the bottom of the fixed insertion member 2 is restored to the original state, and the whole soil with the seedling can easily drop out. Moreover, the soil removal plate can easily remove the soil on the fixed insertion member and the movable insertion member and is returned to the original position by pulling the handle 11 up.

The invention claimed is:

1. A seedling transplanting device, comprising:
a handheld rod having a bottom;
a seedling digging assembly connected to the bottom of the handheld rod;
wherein the seedling digging assembly comprises:
a fixed insertion member with a top and a bottom, the top of the fixed insertion member is connected to the bottom of the handheld rod;
a movable insertion member with a top and a bottom, the movable insertion member is separated by a space from the fixed insertion member, the top of the movable insertion member is rotatably attached to the bottom of the handheld rod; and
a driving assembly connected to the movable insertion member, the driving assembly causes the movable insertion member to swing toward the fixed insertion member,
the driving assembly further comprising:
a driving body with a through hole, the bottom of the handheld rod being inserted into the through hole of the driving body, a first driving shaft hole, a second driving shaft hole and a third driving shaft hole being formed on the driving body;
a pedal assembly with a first end, a first pedal shaft hole and a second pedal shaft hole being formed at the first end of the pedal assembly;
a first movable insertion member shaft hole and a second movable insertion member shaft hole both formed in the top of the movable insertion member, a center of the first movable insertion member shaft hole and a center of the second movable insertion member shaft hole are not aligned vertically;
the movable insertion member and the driving body are inserted into the first end of the pedal assembly, and a first rotating shaft, which passes through the first pedal shaft hole and the first driving shaft hole;
a second rotating shaft is inserted through the second pedal shaft hole, the second driving shaft hole, and the first movable insertion member shaft hole formed on the movable insertion member; and
a third rotating shaft is inserted through the third driving shaft hole and the second movable insertion member shaft hole.

2. The seedling transplanting device of claim 1, wherein the second movable insertion member shaft hole has an elongated shape, and the second driving shaft hole has also an elongated shape; and,
the second movable insertion member shaft hole is slanted in a direction opposite from a direction to which the second driving shaft hole slants.

3. The seedling transplanting device of claim 2, wherein both the second driving shaft hole and the second movable insertion member shaft hole have an arc shape.

4. The seedling transplanting device of claim 1, wherein the first end of the pedal assembly is sheathed outside the driving body.

5. The seedling transplanting device of claim 1, wherein the pedal assembly comprises a fixed pedal member and a moving pedal member in rotatably folded connection to the fixed pedal member; and,
the first end of the fixed pedal member is the first end of the pedal assembly, while the second end thereof is connected to the moving pedal member.

6. The seedling transplanting device of claim 1, wherein the seedling transplanting device further comprises a soil removal device, comprising a soil removal rod, a middle portion of the soil removal rod is movably sheathed on the handheld rod;
a soil removal plate is connected to a bottom of the soil removal rod;
a fixed insertion member hole and a movable insertion member hole are formed on the soil removal plate;
the fixed insertion member is movably disposed within the fixed insertion member hole; and,
the movable insertion member is movably disposed within the movable insertion member hole.

7. The seedling transplanting device of claim 6, wherein a raised auxiliary soil removal pedal pressing portion is disposed in the middle portion of the soil removal rod.

8. The seedling transplanting device of claim 6, wherein the soil removal device further comprises a handheld soil removal jacket which is movably sheathed outside the handheld rod and fixedly connected to the top of the soil removal rod.

9. The seedling transplanting device of claim 1, wherein the fixed insertion member refers to two metal pins arranged at interval, and the movable insertion member refers to two metal blades arranged at interval.

* * * * *